United States Patent [19]

Hartman et al.

[11] 4,271,445
[45] Jun. 2, 1981

[54] SOLID-STATE PROTECTOR CIRCUITRY USING GATED DIODE SWITCH

[75] Inventors: Adrian R. Hartman, New Providence; Robert S. Scott, Mountainside; Peter W. Shackle, Bridgewater, all of N.J.

[73] Assignee: Bell Telephone Laboratories, Incorporated, Murray Hill, N.J.

[21] Appl. No.: 972,055

[22] Filed: Dec. 20, 1978

[51] Int. Cl.³ .............................................. H02H 3/22
[52] U.S. Cl. ........................................ 361/56; 361/91; 361/111; 307/252 F; 307/252 A
[58] Field of Search ................... 361/56, 91, 111, 110, 361/54, 55, 88, 89, 18, 90, 198; 307/252 R, 252 K, 252 J, 252 A, 252 F, 252 D, 301, 302, 299 R, 252 T; 323/22 Z

[56] References Cited
U.S. PATENT DOCUMENTS

| 3,475,653 | 10/1969 | Odenberg et al. | 307/252 J |
| 3,573,550 | 4/1971 | Baker, Jr. | 361/56 |
| 3,904,892 | 9/1975 | Leonard | 307/252 F |

OTHER PUBLICATIONS

"The D13T-A Programmable Unijunction Transistor", by Spofford, Jr., Application Note, General Electric Co., 90.70; 11/67, Dec. 29, 1966.

Primary Examiner—Patrick R. Salce
Attorney, Agent, or Firm—Irwin Ostroff

[57] ABSTRACT

A solid-state protector circuit utilizes the combination of two zener diodes (Z1, Z2), a resistor (R1), a capacitor (C1), and a gated diode switch (GDS) to facilitate the rapid discharge of high voltage transients.

4 Claims, 2 Drawing Figures

SOLID-STATE PROTECTOR CIRCUITRY USING GATED DIODE SWITCH

TECHNICAL FIELD

This invention relates to protection circuitry and, more particularly, to solid-state voltage overload protection circuitry.

BACKGROUND OF THE INVENTION

Zener diodes are commonly used as voltage clamps to provide voltage overload protection. As the magnitude of the voltage and current overload levels to be controlled increases, the size and cost of a zener diode increases commensurately. The cost of zener diodes to afford overload protection from voltage surges of hundreds of volts and tens of amperes usually makes such zener diodes economically nonviable.

For high voltage operation, TRIACs are commonly used. TRIAC voltage overload protectors require a high holding current which is difficult to achieve. In addition, TRIACs are sensitive to dv/dt changes and can be turned on by a relatively small voltage change which occurs in a very short period of time. It is desired that a protection device only turn on if the magnitude of the voltage overload reaches a preselected level.

It is desirable to have solid-state protector circuitry which can relatively rapidly discharge voltage surges of hundreds of volts and at least several amperes when the magnitude of the voltage overload reaches a selected potential and which is relatively insensitive to dv/dt changes.

There have recently become available new forms of solid-state switches which can be operated at high voltages and at high currents. Switches of this kind are disclosed in copending U.S. patent applications Ser. Nos. 972,056 (A. R. Hartman-T. J. Riley-P. W. Shackle), 971,886 (A. R. Hartman-B. T. Murphy-T. J. Riley-P. W. Shackle), and 972,021 (A. R. Hartman-A. U. MacRae-P. W. Shackle), filed concurrently with this application, and in which there are some common inventors and a common assignee, and in the article entitled "A Field Terminated Diode" by Douglas E. Houston et al., published in *IEEE Transactions on Electron Devices*, Vol. ED-23, No. 8, August 1976.

SUMMARY OF THE INVENTION

The present invention involves the use of such solid-state switches in novel circuitry to achieve overload protection circuitry capable of high voltage and high current operation. In one embodiment, such a switch is interconnected with a pair of zener diodes or functionally equivalent devices, of relatively low power capabilities, and a resistor element. In particular, an illustrative circuit includes a gated diode switch having a first zener diode connected between its anode and one circuit terminal and a second zener diode connected between its gate and other circuit terminal. The gate of the GDS is also connected by way of a resistor to the first circuit terminal and the cathode of the GDS is connected to the second circuit terminal.

These and other features and advantages of the present invention are better understood from consideration of the following detailed description taken in conjunction with the accompanying drawing.

DETAILED DESCRIPTION

Figure 1:
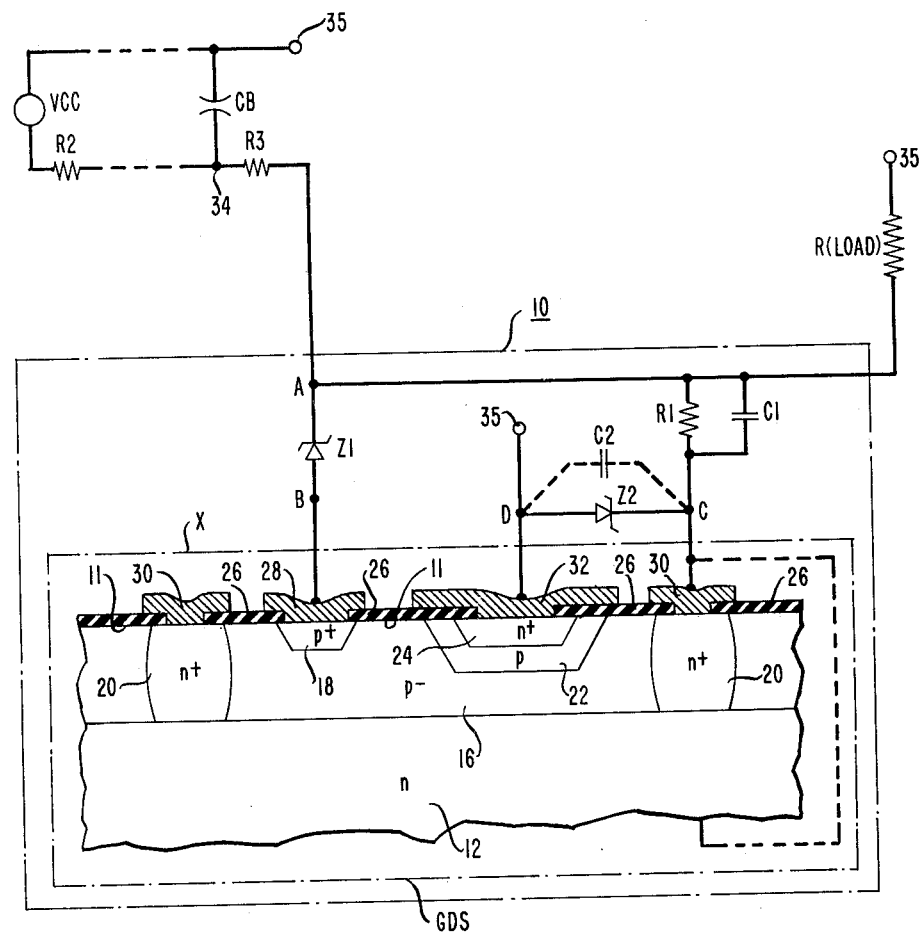
FIGS. 1 and 2 illustrate an embodiment in accordance with the present invention.
Figure 2:
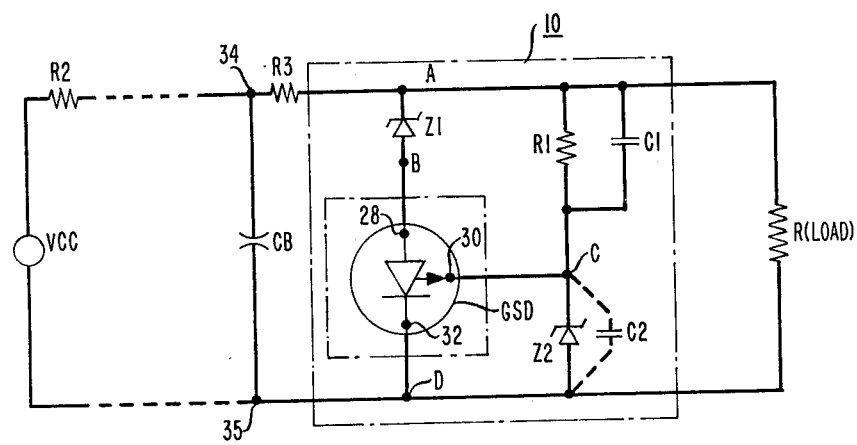

Referring now to FIGS. 1 and 2, there is illustrated within a dashed line rectangle protector circuitry 10 comprising zener diodes Z1 and Z2, a capacitor C1, the parasitic capacitance C2 (illustrated with dashed lines) associated with Z2, a resistor R1, and a gated diode switch (GDS) (within dashed line rectangle X). The gated diode switch, which is illustrated in semiconductor cross section in FIG. 1, is by way of example of the kind disclosed and described in a copending patent application Ser. No. 971,886 (A. R. Hartman et al.), filed concurrently with this application with a common assignee. FIG. 2 is the same as FIG. 1 except that a proposed electrical symbol for the GDS is illustrated instead of the semiconductor cross section.

Protector circuitry 10 is illustrated connected to a load element R (Load) and is coupled to a voltage supply VCC through battery feed resistor R2 and current limiting resistor R3. A carbon block CB is illustrated connected to a common terminal 34 of R2 and R3 and to a terminal 35 which is the return terminal of VCC. The break illustrated between R2 and R3 is meant to represent telephone or other similar lines. These lines are generally outdoors and as such are subject to being struck by lightning. CB serves to greatly attenuate the magnitude of the voltage surge caused by a lightning strike on these lines. Protector circuitry 10 serves to dissipate the remaining high voltage transient and thus to limit damage to R (Load).

A first terminal of each of R1, R (Load), C1, and the cathode of Z1 is coupled to a terminal A. A second terminal of each of R1 and of C1 is coupled to the cathode of Z2 and to the GDS at gate electrode 30 and to terminal C. The dashed line between terminal C and semiconductor wafer (substrate) 12 illustrates that terminal C can be connected to semiconductor wafer (substrate) 12 directly instead of being coupled thereto through electrode 30 and region 20. The anode of Z2 is coupled to the cathode electrode 32 of the GDS, to a terminal D, and to a terminal 35. The anode of Z1 is coupled to anode electrode 28 of the GDS and to a terminal B. Semiconductor regions 18 and 24, and semiconductor wafer 12 (and region 20) serve as the anode, cathode, and gate, respectively, of the GDS. Electrodes 28, 30, 32 are typically aluminum and make low resistance contact to anode region 18, region 20 and wafer 12 (the gate of the GDS), and cathode region 24, respectively. Typical conductivity types for each region are illustrated in the drawing.

The basic operation of the GDS in the ON state is such that there is dual injection of charge carriers between regions 18 and 24 if gate region 12 is of a less positive potential than anode region 18. If the potential of the gate (wafer 12 and region 20) is made more positive than that of anode region 18 and cathode region 24 by a preselected amount, then conduction through the GDS between anode and cathode is cut off or inhibited and the GDS is in the OFF state. Layer 26 it typically $SiO_2$ and the planar surface of the GDS is denoted by the numerical reference 11.

In one typical embodiment, VCC= +48 volts, terminal 35 is held at 0 volts, R1=100 ohms, R2=400 ohms, R3=100 ohms, R (Load)=500 ohms, and C1=1000 pF, C2=30 pF, and VBD (Breakdown Voltage) of Z1=20 volts, VBD (Breakdown Voltage) of Z2=200 volts. With these conditions terminal A is at approximately 25 volts, terminal B is at approximately +5 volts, and terminal C is at approximately +25 volts. With terminal C (the gate of the GDS) at a more positive potential than terminal B (the anode of the GDS) the GDS is biased to the OFF state and there is no conduction between terminals B and D.

Substrate 12 and cathode region 24 of the GDS act as collector and emitter of a vertical n-p-n transistor in which body 16 and region 22 form the base. If the GDS is in the ON state there is conduction between anode region 18 and cathode region 24. This conduction serves as a source of base current such that conduction between substrate 12 and cathode region 24 occurs. If conduction between regions 18 and 24 is cut off, then the supply of base current which supports conduction between substrate 12 and cathode region 24 is cut off. Accordingly, conduction between substrate 12 and cathode region 24 is cut off.

When lightning strikes the electrical lines between R2 and R3, CB attenuates the resulting surge voltage to typically a thousand volts or less. R3 serves to limit the current transient. If the potential of terminal A increases by 220 volts to +245 volts, then Z2 operates in avalanche breakdown and limits the potential of terminal C to approximately +200 volts. Terminal B rises in potential from +5 volts to +225 volts. Terminal B thus becomes more positive in potential than terminal C. Accordingly, the GDS is biased to the ON state and conduction between terminals B (anode region 18) and D (cathode region 24) is initiated. Typically, the voltage drop across terminals B and D with the GDS conducting one ampere is on the order of two to three volts. Since Z1 has a breakdown potential of 20 volts, it operates in avalanche breakdown and terminal A is held in potential at approximately 22–23 volts above VSS. The current flow from anode region 18 to cathode region 24 serves as base current which supports conduction from terminal A, through R1, into substrate 12, out of cathode region 24, and into terminal 35.

Most of the current transient associated with the lightning strike rapidly discharges through Z1 and the anode-cathode of the GDS. As the lightning caused current dissipates the current flow through R1 decreases to a point at which the potential of terminal C increases to a potential value sufficiently more positive than that of terminal B to switch the GDS from the ON to the OFF state. This allows terminal A to return in potential to the initial level of +25 volts which existed prior to the lightning strike.

The use of capacitor C1 serves to prevent protector circuitry 10 from conducting in response to a fast voltage change at terminal A in which the magnitude of the voltage change is less than a preselected value. Without C1, a 100-volt voltage spike applied to terminal A could raise the potential of terminal B to a more positive potential than that of terminal C and thereby activate conduction through the GDS. C1 provides a low impedance alternating current path from terminal A to terminal C which allows terminal C to quickly follow fast voltage changes applied to terminal A. This keeps terminal C at a higher potential than terminal B and thus keeps the GDS from conducting until the magnitude of the voltage change at terminal A is above the preselected value. With C1=1000 pF and C2= approximately 30 pF, it was found that protector circuitry 10 was not triggered even by a 100-volt pulse applied in one microsecond. Thus, the dv/dt sensitivity is high and protector circuitry 10 will not trigger until the magnitude of the voltage reaches the preselected level.

The embodiments described herein are intended to be illustrative of the general principles of the present invention. Various modifications are possible consistent with the spirit of the invention. For example, GDSs other than the one illustrated could be substituted. Voltage polarities would have to be adjusted to different GDS structures. Still further, zener diodes could be replaced with other devices which perform a similar function. Similarly, the resistor (R1) can take any of the forms known to provide a suitable resistance and current carrying capacity.

We claim:

1. Circuitry to be connected to first and second terminals (A,B) across a load (R(Load)) to be protected including a pair of diodes (Z1,Z2) each having the characteristic that it passes little current therethrough below a threshold applied voltage and experiences a relatively constant voltage drop thereacross for increasing current therethrough and a gated diode switch (GDS) having an anode (28), a cathode (32), and a gate (30) terminal, and a resistor (R1) CHARACTERIZED IN THAT:

the first diode (Z1) is connected between the first circuit terminals (A) and the anode of the gated diode switch (GDS);

the second diode (Z2) is connected between the gate (30) of the switch (GDS) and the second terminal;

the cathode of the switch (GDS) is connected to the second circuit terminal (B); and the resistor (R1) is connected between the first circuit terminal (A) and the gate (30) of the switch (GDS).

2. The circuitry of claim 1 further CHARACTERIZED BY capacitor means (C1) connected between the first circuit terminal (A) and the gate (30) of the switch (GDS).

3. The circuitry of claim 2 CHARACTERIZED IN THAT the first and second diodes (Z1, Z2) are zener diodes.

4. Circuitry including a first device (Z1) having first and second terminals and having the characteristic that there is substantially no conduction therethrough in one direction until a threshold voltage is reached and thereafter the voltage across the devices stays essentially constant for increasing conduction therethrough and is CHARACTERIZED BY:

a second device (Z2) having first and second terminals and characteristics similar to the first device;

a gated diode type switch (GDS) having anode (28), cathode (32), and gate (30) terminals;

a resistor (R1) having first (A) and second (C) terminals with the first terminal (A) being coupled to the second terminal of the first device (Z1) and the second terminal (C) of the resistor (R1) being coupled to the gate terminal (30) of the switch (GDS) and to the second terminal of the second device (Z2);

first terminal of first device (Z1) is connected to the anode of the gated diode switch (GDS); and the first terminal (B) of the second device (Z2) being coupled to the cathode of the gate diode switch (GDS).

* * * * *